United States Patent
Chae et al.

(10) Patent No.: US 9,454,512 B2
(45) Date of Patent: Sep. 27, 2016

(54) METHOD OF GENERATING CORRELATION FUNCTION, METHOD OF TRACKING SIGNAL AND SIGNAL TRACKING SYSTEM

(71) Applicant: RESEARCH & BUSINESS FOUNDATION SUNGKYUNKWAN UNIVERSITY, Suwon-si (KR)

(72) Inventors: Keunhong Chae, Suwon-si (KR); Seokho Yoon, Suwon-si (KR)

(73) Assignee: RESEARCH & BUSINESS FOUNDATION SUNGKYUNKWAN UNIVERSITY, Suwon-si (KR)

(*) Notice: Subject to any disclaimer, the term of this patent is extended or adjusted under 35 U.S.C. 154(b) by 282 days.

(21) Appl. No.: 14/278,840

(22) Filed: May 15, 2014

(65) Prior Publication Data
US 2014/0351306 A1 Nov. 27, 2014

(30) Foreign Application Priority Data

May 22, 2013 (KR) .................. 10-2013-0057664

(51) Int. Cl.
| | |
|---|---|
| *G06F 1/02* | (2006.01) |
| *G06F 17/15* | (2006.01) |
| *G01S 19/24* | (2010.01) |
| *G01S 19/30* | (2010.01) |

(52) U.S. Cl.
CPC .............. *G06F 17/15* (2013.01); *G01S 19/24* (2013.01); *G01S 19/30* (2013.01)

(58) Field of Classification Search
CPC ......... G06F 17/17; G01S 19/24; G01S 19/30

USPC ........................... 708/270, 422, 426
See application file for complete search history.

(56) References Cited

U.S. PATENT DOCUMENTS

| | | | | |
|---|---|---|---|---|
| 2004/0071200 A1* | 4/2004 | Betz | ................. | H04B 1/70752 375/152 |
| 2006/0097915 A1* | 5/2006 | Martin | ................. | G01S 19/30 342/357.59 |
| 2007/0274374 A1* | 11/2007 | Abraham | ................. | G01S 19/30 375/148 |
| 2008/0069187 A1* | 3/2008 | Chen | ................. | G01S 19/30 375/148 |
| 2010/0027593 A1* | 2/2010 | De Latour | ................. | G01S 19/24 375/150 |

OTHER PUBLICATIONS

Yao, Zheng, et al. "Unambiguous technique for multiplexed binary offset carrier modulated signals tracking," *Signal Processing Letters, IEEE*, vol. 16, No. 7, (Jul. 2009): pp. 608-611.

* cited by examiner

*Primary Examiner* — Tan V. Mai
(74) *Attorney, Agent, or Firm* — NSIP Law

(57) ABSTRACT

A method of generating a correlation function, a method of tracking a signal, and a signal tracking apparatus are provided. The method of generating a correlation function involves receiving a CBOC(6,1,1/11) signal, interpreting a subcarrier pulse period of the CBOC(6,1,1/11) signal as a subcarrier pulse period of $BOC_{sin}(6,1)$, combining partial correlation functions constituting an autocorrelation function of CBOC(6,1,1/11) to generate a correlation function, and weighted-combining the correlation function to generate an unambiguous correlation function.

19 Claims, 6 Drawing Sheets

METHOD OF GENERATING CORRELATION FUNCTION, METHOD OF TRACKING SIGNAL AND SIGNAL TRACKING SYSTEM

CROSS-REFERENCE TO RELATED APPLICATION

This application claims the benefit under 35 USC 119(a) of Korean Patent Application No. 10-2013-0057664 filed on May 22, 2013, in the Korean Intellectual Property Office, the entire disclosure of which is incorporated herein by reference for all purposes.

BACKGROUND

1. Field

The following description relates to a method of generating a correlation function whose side-peaks have been removed for CBOC signal synchronization, a method of tracking a signal using this correlation function, and a signal tracking apparatus using the correlation function.

2. Description of Related Art

A binary offset carrier (BOC) signal has been adopted as a global navigation satellite system (GNSS) modulation scheme for a next-generation satellite navigation system, such as Galileo or GPS III.

In the GNSS, a temporal error generated in a synchronization process may appear as a serious position error. Therefore, signal synchronization is very important for reliable GNSS-based communication.

In recent years, a new BOC signal such as a composite binary offset carrier (CBOC), as well as sine phased BOC (Sin BOC) and cosine phased BOC (Cos BOC), has been proposed and attracts attention for use in a next generation GNSS since the signal exhibits relatively excellent performance in a multipath environment due to a narrow width of a correlation function.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating a correlation function, the method including receiving a CBOC(6,1,1/11) signal, interpreting a subcarrier pulse period of the CBOC(6,1,1/11) signal as a subcarrier pulse period of $BOC_{sin}(6,1)$, combining partial correlation functions constituting an autocorrelation function of CBOC(6,1,1/11) to generate a correlation function, and weighted-combining the correlation function to generate an unambiguous correlation function.

The receiving may be performed by a reception unit; the interpreting, the combining and the weighted-combining may be performed by a calculation unit; and the calculation unit may include a processor.

The CBOC(6,1,1/11) signal may include a CBOC(6,1,1/11,'+') signal and a CBOC(6,1,1/11,'−') signal.

The interpreting may include interpreting a subcarrier pulse period of the CBOC(6,1,1/11,'−') signal expressed by the following Equation as a subcarrier pulse period of $BOC_{sin}(6,1)$:

$$s_{sc}(t) = \sqrt{\frac{10}{11}} BOC_{sin}(1,1) - \sqrt{\frac{1}{11}} BOC_{sin}(6,1)$$

$$= \sqrt{\frac{10}{11}} \sum_{l=0}^{1}(-1)^l r_{T_s^a}(t - iT_c - lT_s^a) -$$

$$\sqrt{\frac{1}{11}} \sum_{m=0}^{11}(-1)^m r_{T_s^b}(t - iT_c - mT_s^b)$$

$$= \sum_{m=0}^{11} S_m(t)$$

wherein denotes $T_s^c = T_c/2$ the subcarrier pulse period of BOC(1,1), and $T_s^b = T_c/12$ denotes the subcarrier pulse period of $BOC_{sin}(6,1)$.

The autocorrelation function may be expressed by the following Equation:

$$R(\tau) = \frac{1}{PT} \int_0^T b(t)b(t+\tau)dt$$

$$= \sum_{m=0}^{11} \sum_{j=0}^{T/T_c-1} \frac{1}{PT} \int_{(12j+m)T_s^b}^{(12j+m+1)T_s^b} b(t)b(t+\tau)dt$$

$$= \sum_{m=0}^{11} S_m(t)$$

wherein b(t) denotes the CBOC(6,1,1/11,'−') signal, P denotes signal power, T denotes a period of a pseudo-noise code, $T_s^b$ denotes the subcarrier pulse period of $BOC_{sin}(1,1)$, $T_s^b$ dentoes the subcarrier pulse period of $BOC_{sin}(6,1)$, and $S_m(\tau)$ is the $m^{th}$ partial correlation function.

The generating of the correlation function may involve combining the partial correlation functions for the CBOC (6,1,1/11,'−') signal using the following Equation to generate an unambiguous correlation function ($\{R_m\}_{m=0}^{5}$) whose side-peaks have been removed:

$$R_m = |S_m(\tau)| + |S_{11-m}(\tau)| - |S_m(\tau) - S_{11-m}(\tau)|, m=0,1,\ldots,5$$

wherein $S_m(\tau)$ denotes the $m^{th}$ partial correlation function constituting the autocorrelation function of the CBOC(6,1,1/11,'−') signal.

The generating of the unambiguous correlation function may include weighted-combining the combined partial correlation functions using the following Equation to generate the unambiguous correlation function ($R_{proposed}(\tau)$):

$$R_{proposed}(\tau) = \sum_{m=0}^{5} R_m(\tau).$$

In another general aspect, there is provided a non-transitory computer recording medium storing a program causing a computer to execute the method as described above.

In another general aspect, there is provided a method of tracking a signal in a terminal that synchronizes a CBOC signal, the method involving receiving, by the terminal, a CBOC(6,1,1/11) signal, interpreting a subcarrier pulse period of the CBOC(6,1,1/11) signal as a subcarrier pulse period of $BOC_{sin}(6,1)$, combining partial correlation functions constituting an autocorrelation function of CBOC(6, 1,1/11) to generate a correlation function, weighted-combining the combined partial correlation functions to generate an unambiguous correlation function, and tracking the CBOC signal using the unambiguous correlation function.

The interpreting may involve interpreting a subcarrier pulse period of CBOC(6,1,1/11,'−') that is a form of subtraction of a subcarrier of $BOC_{sin}(6,1)$ and a subcarrier of $BOC_{sin}(1,1)$ using a power division ratio 1/11, as a subcarrier pulse period of $BOC_{sin}(6,1)$.

The generating of the correlation function may involve combining the partial correlation functions for the CBOC (6,1,1/11,'−') signal using the following Equation to generate an unambiguous correlation function ($\{R_m\}_{m-1}^5$) whose side-peaks have been removed:

$$R_m = |S_m(\tau)| + |S_{11-m}(\tau)| - |S_m(\tau) - S_{11-m}(\tau)|, \; m=0, 1, \ldots, 5$$

wherein $S_m(\tau)$ denotes the $m^{th}$ partial correlation function constituting the autocorrelation function of the CBOC(6,1, 1/11,'−') signal.

The generating of the unambiguous correlation function may involve weighted-combining the combined partial correlation functions using the following Equation to generate the unambiguous correlation function ($R_{proposed}(\tau)$):

$$R_{proposed}(\tau) = \sum_{m=0}^{5} R_m(\tau).$$

In yet another general aspect, there is provided a signal tracking apparatus that synchronizes a CBOC signal, the apparatus including: a reception unit configured to receive a CBOC(6,1,1/11) signal, a partial correlation function generation unit configured to interpret a subcarrier pulse period of the CBOC(6,1,1/11) signal as a subcarrier pulse period of $BOC_{sin}(6,1)$ to generate a partial correlation function, a correlation function generation unit configured to combine the partial correlation functions to generate a correlation function of the CBOC(6,1,1/11) signal, an unambiguous correlation function generation unit configured to weighted-combine the correlation function to generate an unambiguous correlation function, and a determination unit configured to track a signal using the unambiguous correlation function.

The partial correlation function generation unit may be configured to interpret a subcarrier pulse period of CBOC (6,1,1/11,'−') that is a form of subtraction of a subcarrier of $BOC_{sin}(6,1)$ and a subcarrier of $BOC_{sin}(1,1)$ using a power division ratio 1/11, as a subcarrier pulse period of $BOC_{sin}$ (6,1).

The partial correlation functions may be combined according to the following Equation to constitute an autocorrelation function $R(\tau)$:

$$R(\tau) = \frac{1}{PT} \int_0^T b(t)b(t+\tau)dt$$

$$= \sum_{m=0}^{11} \sum_{j=0}^{T/T_c - 1} \frac{1}{PT} \int_{12(j+m)T_s^b}^{(12j+m+1)T_s^b} b(t)b(t+\tau)dt$$

$$= \sum_{m=0}^{11} S_m(\tau)$$

wherein b(t) denotes the CBOC(6,1,1/11,'−') signal, P denotes signal power, T denotes a period of a pseudo-noise code, $T_s^c$ sdenotes the subcarrier pulse period of $BOC_{sin}(1,1)$, $T_s^b$ dentoes the subcarrier pulse period of $BOC_{sin}(6,1)$, and $S_m(\tau)$ is the $m^{th}$ partial correlation function.

The correlation function generation unit may be configured to combine the partial correlation functions for the CBOC(6,1,1/11,'−') signal using the following equation to generate a correlation function ($\{R_m\}_{m-0}^5$) whose side-peaks have been removed:

$$R_m = |S_m(\tau)| + |S_{11-m}(\tau)| - |S_m(\tau) - S_{11-m}(\tau)|, \; m=0, 1, \ldots, 5$$

wherein $S_m(\tau)$ denotes the $m^{th}$ partial correlation function constituting the autocorrelation function of the CBOC(6,1, 1/11,'−') signal.

The unmbiguous correlation function generation unit may be configured to weighted-combine a correlation function generated by combining the partial correlation functions using the following equation to generate the unambiguous correlation function ($R_{proposed}(\tau)$):

$$R_{proposed}(\tau) = \sum_{m=0}^{5} R_m(\tau).$$

Other features and aspects will be apparent from the following detailed description, the drawings, and the claims.

Figure 1:
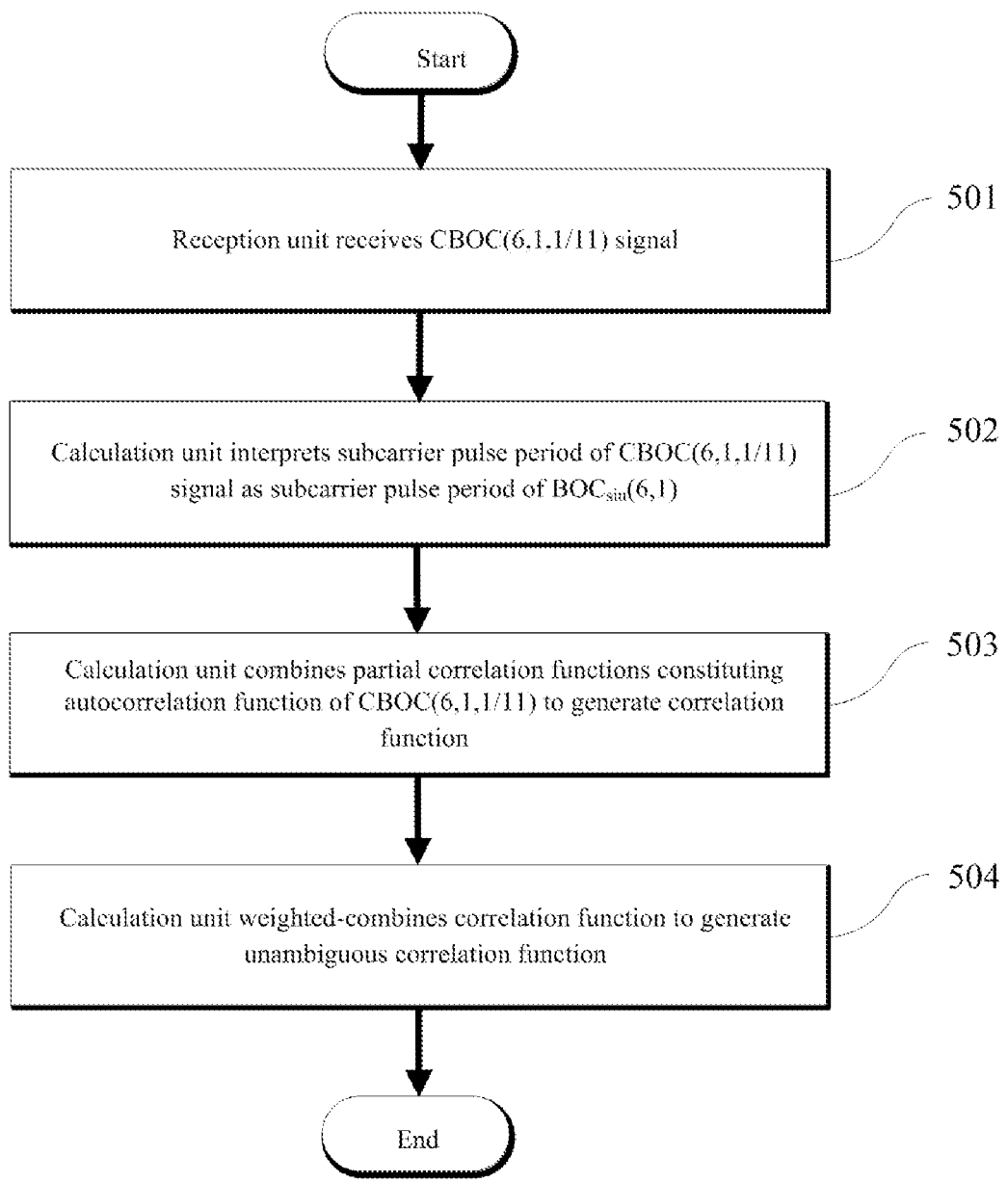
FIG. 1 illustrates a flowchart of an example of a method of generating a CBOC correlation function.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, andor systems described herein. However, various changes, modifications, and equivalents of the systems, apparatuses andor methods described herein will be apparent to one of ordinary skill in the art. The progression of processing steps andor operations described is an example; however, the sequence of andor operations is not limited to that set forth herein and may be changed as is known in the art, with the exception of steps andor operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

All terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" andor "including," when used herein, specify the presence of stated features, integers, steps, operations, elements, andor components, but do not preclude the presence or addition of one or more other features, integers, steps, operations, elements, components, andor groups thereof.

It should also be noted that in performing a method or an operating method, processes of the method may occur out of noted order unlike otherwise mentioned. In other words, the respective processes may be executed in the same order as the noted order, may be executed substantially concurrently, or may be executed in the reverse order.

Since an autocorrelation function of a CB OC(6,1,1/11) signal includes one main peak and several side-peaks, there may occur issues in that synchronization occurs in the side-peaks. In an existing scheme, a new local signal has been generated and a new correlation function has been proposed in order to solve the issues (Zheng Yao, "Unambiguous Technique for Multiplexed Binary Offset Carrier Modulated Signals Tracking" IEEE Signal Processing Letters, vol. 16, Issue 7, pp. 608-611, July 2009). The side-peaks of the autocorrelation function are removed and ambiguousness is eliminated in the conventional scheme; however, code tracking performance may be greatly degraded in a multipath channel environment due to failing in sufficient use of advantages from $BOC_{sin}(6,1)$.

An example according to the present disclosure relates to a method of tracking a CBOC signal that is robust to a multipath channel environment for a CBOC(6,1,1/11) signal expected to be actually used for GPS L1C and Galileo E1 open service among BOC signals used for a (global navigation satellite system) modulation scheme for a next-generation satellite navigation system, such as Galileo or global positioning system (GPS) III.

In one general aspect, there is provided a method of generating a CBOC correlation function includes receiving, by a reception unit, a CBOC(6,1,1/11) signal; interpreting, by a calculation unit, a subcarrier pulse period of the CBOC(6,1,1/11) signal as a subcarrier pulse period of $BOC_{sin}(6,1)$; combining, by the calculation unit, partial correlation functions constituting an autocorrelation function of CBOC(6,1,1/11) to generate a correlation function; and weighted-combining, by the calculation unit, the correlation function to generate an unambiguous correlation function.

The CBOC(6,1,1/11) signal includes a CBOC(6,1,1/11, '+') signal and a CBOC(6,1,1/11,'−') signal.

In another general aspect, there is provided a method of tracking a CBOC signal includes receiving, by a terminal, a CBOC(6,1,1/11) signal; interpreting, by the terminal, a subcarrier pulse period of the CBOC(6,1,1/11) signal as a subcarrier pulse period of $BOC_{sin}(6,1)$; combining, by the terminal, partial correlation functions constituting an autocorrelation function of CBOC(6,1,1/11) to generate a correlation function; weighted-combining, by the terminal, the combined partial correlation functions to generate an unambiguous correlation function; and tracking, by the terminal, the CBOC signal using the unambiguous correlation function.

The interpreting includes interpreting a subcarrier pulse period of CBOC(6,1,1/11,'−') which is a form of subtraction of a subcarrier of $BOC_{sin}(6,1)$ and a subcarrier of $BOC_{sin}(1,1)$ using a power division ratio 1/11, as a subcarrier pulse period of $BOC_{sin}(6,1)$.

In yet another general aspect, there is provided a CBOC signal tracking system includes a reception unit which receives a CBOC(6,1,1/11) signal; a partial correlation function generation unit which interprets a subcarrier pulse period of the CBOC(6,1,1/11) signal as a subcarrier pulse period of $BOC_{sin}(6,1)$ to generate a partial correlation function; a correlation function generation unit which combines the partial correlation functions to generate a correlation function of the CBOC(6,1,1/11) signal; an unambiguous correlation function generation unit which weighted-combines the correlation function to generate an unambiguous correlation function; and a determination unit which tracks a signal using the unambiguous correlation function.

The partial correlation function generation unit interprets a subcarrier pulse period of CBOC(6,1,1/11,'−') which is a form of subtraction of a subcarrier of $BOC_{sin}(6,1)$ and a subcarrier of $BOC_{sin}(1,1)$ using a power division ratio 1/11, as a subcarrier pulse period of $BOC_{sin}(6,1)$.

Hereinafter, a method of generating a CBOC correlation function, a method of tracking a CBOC signal, and a CBOC signal tracking system will be described in detail with reference to the drawings.

FIG. 1 is a flowchart of an example of a method 500 of generating a CBOC correlation function. The method of generating a CBOC correlation function involve: receiving in 501, by a reception unit, a CBOC(6,1,1/11) signal; interpreting in 502, by a calculation unit, a subcarrier pulse period of the CBOC(6,1,1/11) signal as a subcarrier pulse period of $BOC_{sin}(6,1)$; combining in 503, by the calculation unit, partial correlation functions constituting an autocorrelation function of CBOC(6,1,1/11) to generate a correlation function; and weighted-combining in 504, by the calculation unit, the correlation function to generate an unambiguous correlation function.

The reception unit refers to a receiver device that receives the CBOC signal, and the calculation unit refers to an arithmetic unit such as a computer processor used in a CBOC signal synchronization system or a CBOC signal tracking system. That is, the calculation unit may be implemented with a processor. Various hardware configurations capable of performing the method described above may be applied to provide the hardware component of the reception unit and the calculation unit.

The BOC signal is generally divided into sine and cosine phased BOCs according to a phase of a subcarrier. The sine and cosine phased BOCs refer to subcarriers having sine and cosine phases, and are indicated by $BOC_{sin}(kn, n)$ and $BOC_{cos}(kn, n)$, respectively.

Here, k is a positive integer indicating a ratio of a pseudo-noise code rate to a subcarrier frequency. In addition, n indicates a ratio of the pseudo-noise code rate to 1.023 MHz, and indicates that there is a subcarrier having a k period inside one pseudo-noise code chip.

Among several BOC signals, CBOC(6,1,1/11) to be actually used for GPS L1C and Galileo E1 open service is divided into CBOC(6,1,1/11,'+') for data transfer and a CBOC(6,1,1/11,'−') for synchronization. In this example, CBOC(6,1,1/11,'+') and CBOC(6,1,1/11,'−') indicate forms of addition and subtraction of $BOC_{sin}(6,1)$ and $BOC_{sin}(1,1)$ using a power division ratio 1/11.

The present example is applicable to both signals of CBOC(6,1,1/11,'+') and CBOC(6,1,1/11,'−'). However, the present example will be described in connection with CBOC(6,1,1/11,'−') which is a signal model for synchronization since the present example is basically used for the purpose of synchronization. CBOC(6,1,1/11,'−') is expressed as shown in Equation 1 below.

$$b(t) = \sqrt{P} \sum_{i=-\infty}^{\infty} c_i r_{T_c}(t - iT_c) d(t) s_{sc}(t) \qquad \text{[Equation 1]}$$

Here, P denotes signal power, $c_i \in \{-1,1\}$ denotes an chip of the pseudo-noise code having a period of T, $T_c$ denotes a pseudo-noise code chip period, $r_{T_c}(t)$ denotes a unit square wave present in $|0, T_c|$, and d(t) denotes navigation data. The navigation data has a characteristic that d(t)=1 for fast and accurate synchronization. The subcarrier is expressed as Equation 2 below.

$$\begin{aligned} s_{sc}(t) &= \sqrt{\frac{10}{11}} BOC_{sin}(1,1) - \sqrt{\frac{1}{11}} BOC_{sin}(6,1) \qquad \text{[Equation 2]} \\ &= \sqrt{\frac{10}{11}} \sum_{l=0}^{1} (-1)^l r_{T_s^a}(t - iT_c - lT_s^a) - \\ &\quad \sqrt{\frac{1}{11}} \sum_{m=0}^{11} (-1)^m r_{T_s^b}(t - iT_c - mT_s^b) \\ &= \sum_{m=0}^{11} s_m(t) \end{aligned}$$

Here, $T_s^c = T_c/2$ denotes a subcarrier pulse period of $BOC_{sin}(1,1)$, and $T_s^b = T_c/12$ denotes a subcarrier pulse period of $BOC_{sin}(6,1)$.

The subcarrier pulse period $T_s$ of CBOC(6,1,1/11,'−') is a form of subtraction of the subcarrier of $BOC_{sin}(6,1)$ and the subcarrier of $BOC_{sin}(1,1)$ using the power division ratio 1/11. In the present example, the calculation unit interprets the subcarrier pulse period $T_s$ of CBOC(6,1,1/11,'−') as a subcarrier pulse period $T_s^b$ of $BOC_{sin}(6,1)$ (i.e., $T_s = T_s^b$). Meanwhile, the $n^{th}$ subcarrier pulse of CBOC(6,1,1/11,'−') is $s_m(\tau)$.

Figure 2:
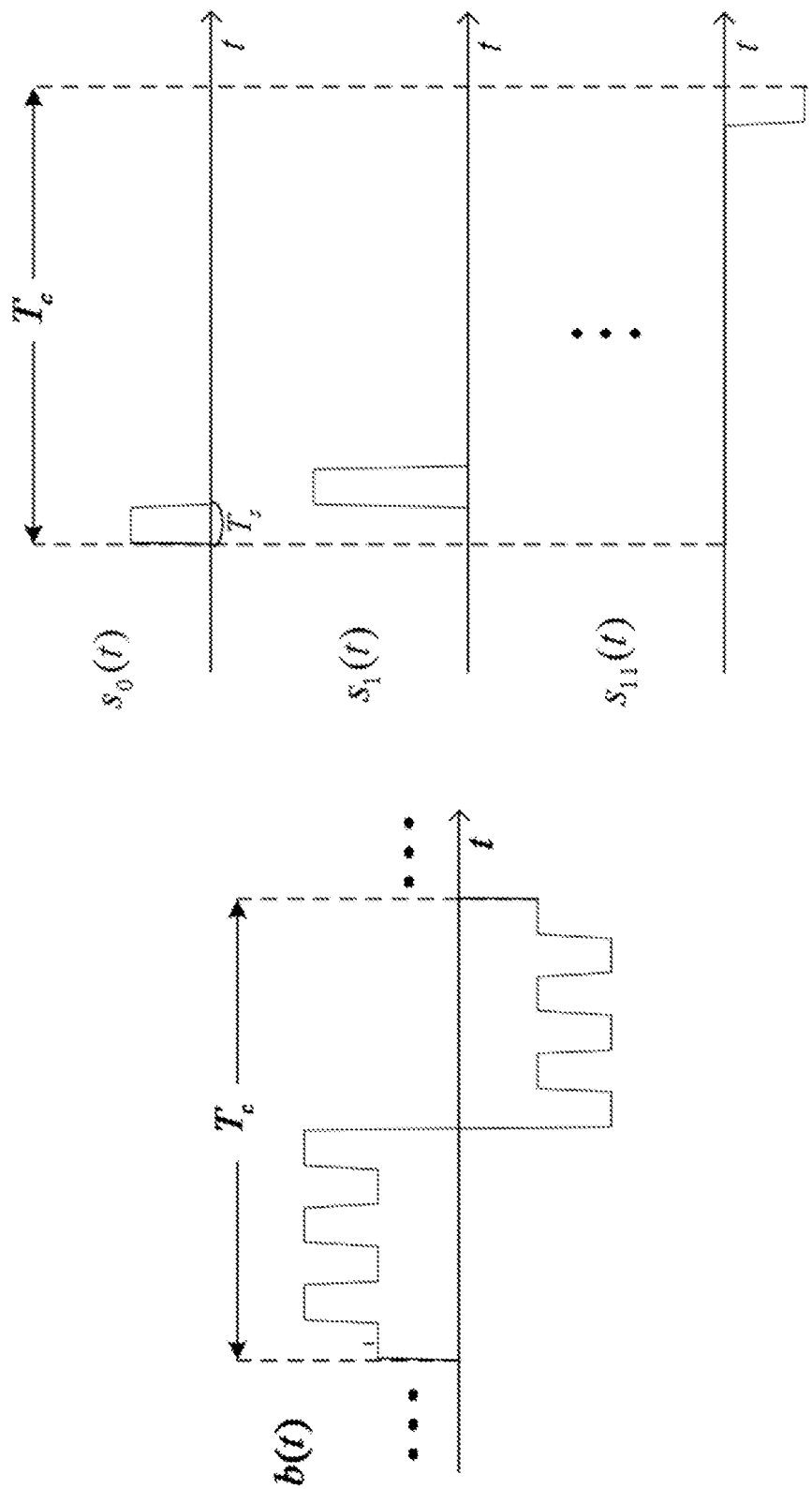
FIG. 2A illustrates an example of a subcarrier of CBOC (6,1,1/11,'−').
FIG. 2B illustrates an example of subcarrier pulses of $S_m(t)$.

FIG. 2A illustrates an example of the subcarrier of CBOC (6,1,1/11,'−'), and FIG. 2B illustrates an example of subcarrier pulses of $s_m(t)$. FIGS. 2A and 2B illustrate CBOC (6,1,1/11,'−') and subcarrier pluses $\{S_m(t)\}_{m=0}^{11}$. FIGS. 2A and 2B illustrate that the period of the subcarrier pulse of the present example is the same as the subcarrier pulse period of $BOC_{sin}(6,1)$.

In the present example, all pseudo-noise code chips are assumed to be generated with the same probability as independent random variables of +1 and −1. Further, the pseudo-noise code period T is generally much greater than the pseudo-noise code chip period $T_c$. A normalized CBOC (6,1,1/11,'−') autocorrelation function is defined as shown in Equation 3 below.

$$\begin{aligned} R(\tau) &= \frac{1}{PT} \int_0^T b(t) b(t+\tau) dt \qquad \text{[Equation 3]} \\ &= \sum_{m=0}^{11} \sum_{j=0}^{T/T_c-1} \frac{1}{PT} \int_{12(j+m)T_s^b}^{(12j+m+1)T_s^b} b(t)b(t+\tau)dt \\ &= \sum_{m=0}^{11} S_m(\tau) \end{aligned}$$

$S_m(\tau)$ is defined as the $m^{th}$ partial correlation function, and the autocorrelation function of CBOC(6,1,1/11,'−') is expressed as a simple sum of partial correlation functions $\{S_m(\tau)\}_{m=0}^{11}$ according to Equation 3 above.

Figure 3:
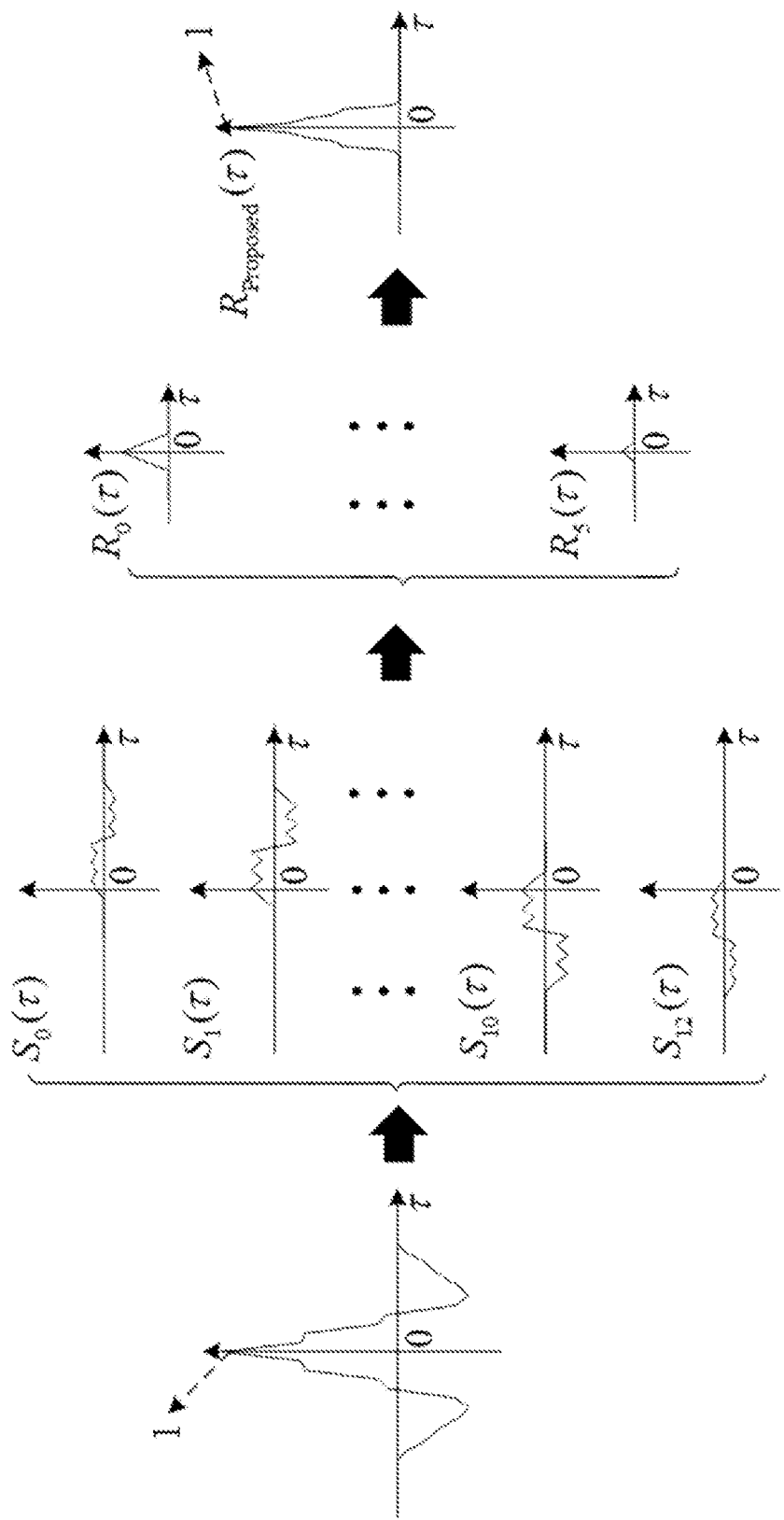
FIG. 3A illustrates an example of an autocorrelation function of CBOC(6,1,1/11,'−') according to an example of a process of generating an unambiguous correction function.
FIG. 3B illustrates an example of a partial correlation functions constituting the autocorrelation function of FIG. 3A.
FIG. 3C illustrates an example of a process of weighted-combining a correlation function generated by combining the partial correlation functions of FIG. 3B.
FIG. 3D illustrates an example of an unambiguous correlation function generated by weighted-combining the correlation function of FIG. 3C.

FIGS. 3A to 3D illustrate an example of a process of generating an unambiguous correlation function. It can be seen from FIGS. 3A to 3D that the simple sum of the partial correlation functions $\{S_m(\tau)\}_{m=0}^{11}$ constitutes the autocorrelation function of CBOC(6,1_9,1/11,'−'). FIG. 3A illustrates the autocorrelation function of CBOC(6,1_9,1/11,'−'). FIG. 3B illustrates the partial correlation functions constituting the autocorrelation function. FIG. 3C illustrates a process of weighted-combining a correlation function generated by combining the partial correlation functions. FIG. 3D illustrates an unambiguous correlation function finally generated by weighted-combining the correlation functions.

All of the partial correlation functions $\{S_m(\tau)\}_{m=0}^{11}$ satisfy $\{S_m \times S_{11-m} \leq 0\}_{m=0}^{5}$ out of a range constituting a main peak of the CBOC(6,1/11,'−') autocorrelation function. Therefore, the calculation unit may generate the correlation function whose side-peaks have been removed for the CBOC(6,1,1/11,'−') autocorrelation function using $\{|S_m(\tau)|+|S_{11-m}(\tau)|-|(\tau)-S_{11-m}(\tau)|=0\}_{m=0}^{5}$. This can be expressed as shown in Equation 4 below.

$$R_m = |S_m(\tau)| + |S_{11-m}(\tau)| - |S_m(\tau) - S_{11-m}(\tau)|, \; m=0, 1,\ldots, 5 \qquad \text{[Equation 4]}$$

Furthermore, the calculation unit weighted-combines the generated correlation functions to generate a new unambiguous correlation function, $R_{proposed}(\tau)$, as shown in Equation 5 below.

$$R_{proposed}(\tau) = \sum_{m=0}^{5} R_m(\tau) \qquad \text{[Equation 5]}$$

In the new unambiguous correlation function $R_{proposed}(\tau)$, side-peaks of the CBOC(6,1,1/11,'−') autocorrelation function are completely removed through an absolute value operation and a weighted-combination operation using advantages of $BOC_{sin}(6,1)$ efficiently.

Figure 4:
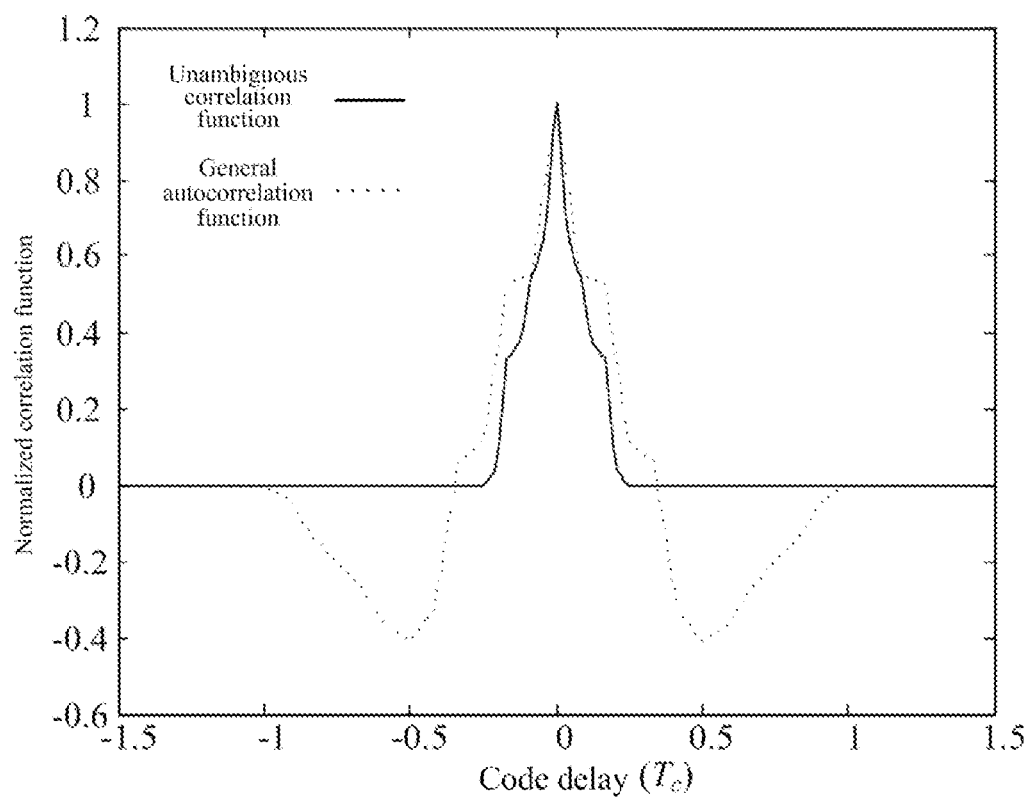
FIG. 4 illustrates an example of a CBOC(6,1,1/11,'−') autocorrelation function and an unambiguous correlation function in which CBOC(6,1,1/11, '−') is interpreted as a subcarrier pulse period of $BOC_{sin}(6,1)$.

FIG. 4 illustrates an example of a general CBOC(6,1,1/11,'−') autocorrelation function and an unambiguous correlation function in which CBOC(6,1,1/11,'−') is interpreted as a subcarrier pulse period of $BOC_{sin}(6,1)$.

Referring to FIG. 4, it can be seen that the side-peaks of the CBOC(6,1,1/11,'−') autocorrelation function have been completely removed in the new unambiguous correlation function $R_{proposed}(\tau)$ of the present example.

As described above, the above process is also applied to CBOC(6,1,1/11,'+') for data transfer, and a final correlation function is also derived in the same way.

An output of a determiner for tracking the CBOC(6,1,1/11) signal code may be expressed as shown in Equation 6 below.

$$D(\tau) = R_{proposed}^2\left(\tau + \frac{\Delta}{2}\right) - R_{proposed}^2\left(\tau - \frac{\Delta}{2}\right) \quad \text{[Equation 6]}$$

Here, $\Delta$ denotes an interval. The output of the determiner works until $\tau$ becomes 0 by a numerically controlled oscillator of a delay-locked loop.

Figure 5:
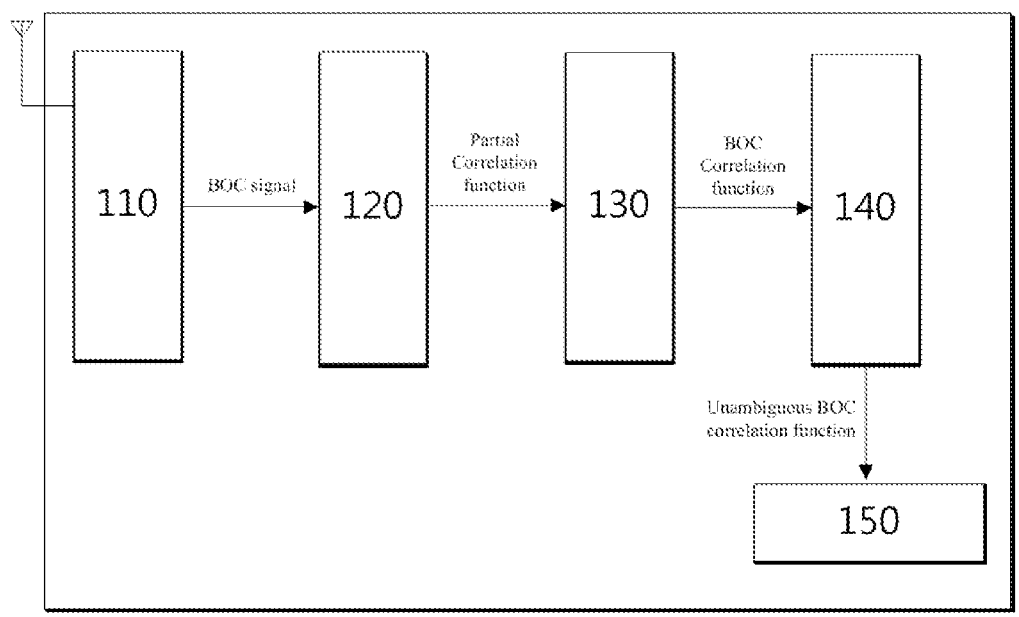
FIG. 5 illustrates an example of a schematic block diagram of a CBOC signal tracking apparatus.

FIG. 5 is an example of a schematic block diagram of a CBOC signal tracking system 100 including a CBOC signal tracking apparatus. The CBOC signal tracking apparatus includes a reception unit 110 that receives a CBOC(6,1,1/11) signal, a partial correlation function generation unit 120 that interprets a subcarrier pulse period of the CBOC(6,1,1/11) signal as a subcarrier pulse period of $BOC_{sin}(6,1)$ to generate partial correlation functions, a correlation function generation unit 130 that combines the partial correlation functions to generate a correlation function of the CBOC(6,1,1/11) signal, an unambiguous correlation function generation unit 140 that weighted-combines the correlation function to generate an unambiguous correlation function, and a determination unit 150 that tracks a signal using the unambiguous correlation function. The same content as that of the method of generating a CBOC correlation function described above will be simply described.

The partial correlation function generation unit 120 interprets the subcarrier pulse period of CBOC(6,1,1/11,'−') that is a form of subtraction of the subcarrier of $BOC_{sin}(6,1)$ and the subcarrier of $BOC_{sin}(1,1)$ using the power division ratio 1/11, as a subcarrier pulse period of $BOC_{sin}(6,1)$.

The partial correlation functions are combined as shown in Equation 3 to constitute the autocorrelation function ($R(\tau)$)

The correlation function generation unit 130 combines the partial correlation functions for the CBOC(6,1,1/11, '−') signal through Equation 4 described above, to thereby generate a correlation function ($\{R_m\}_{m=0}^5$) whose side-peaks have been removed.

The unambiguous correlation function generation unit 140 weighted-combines the correlation function generated by combining the partial correlation functions to generate the unambiguous correlation function ($R_{proposed}(\tau)$) using Equation 5 described above.

A signal output by the determination unit 150 is expressed as shown in Equation 6 described above.

Hereinafter, a result of comparing effects of a scheme using the correlation function proposed by the present example with effects of an existing scheme will be described. The conventional method is a scheme disclosed by Zheng Yao, et al. in an article "Unambiguous Technique for Multiplexed Binary Offset Carrier Modulated Signals Tracking" (IEEE Signal Processing Letters, vol. 16, Issue 7, pp. 608-611, July 2009). Hereinafter we will describe the conventional method of Zheng Yao as Zheng Yao method.

Multipath error envelope (MEE) performance was compared based on a simulation result using the new unambiguous correlation function and a correlation function of Zheng Yao method. The simulation was performed on the assumption that T=4 ms, $B_L$=1 Hz, $T_I$=T, $T_c^{-1}$=1.023MHz, and $\Delta$=0.083 [$T_c$] when a ratio of sizes of signals of first and second paths was 0.25 in a situation in which there was no noise in the signals. Here, $B_L$ denotes a bandwidth of a loop filter, $T_I$ denotes an integration time, and X denotes a parameter used in the conventional method.

Figure 6:
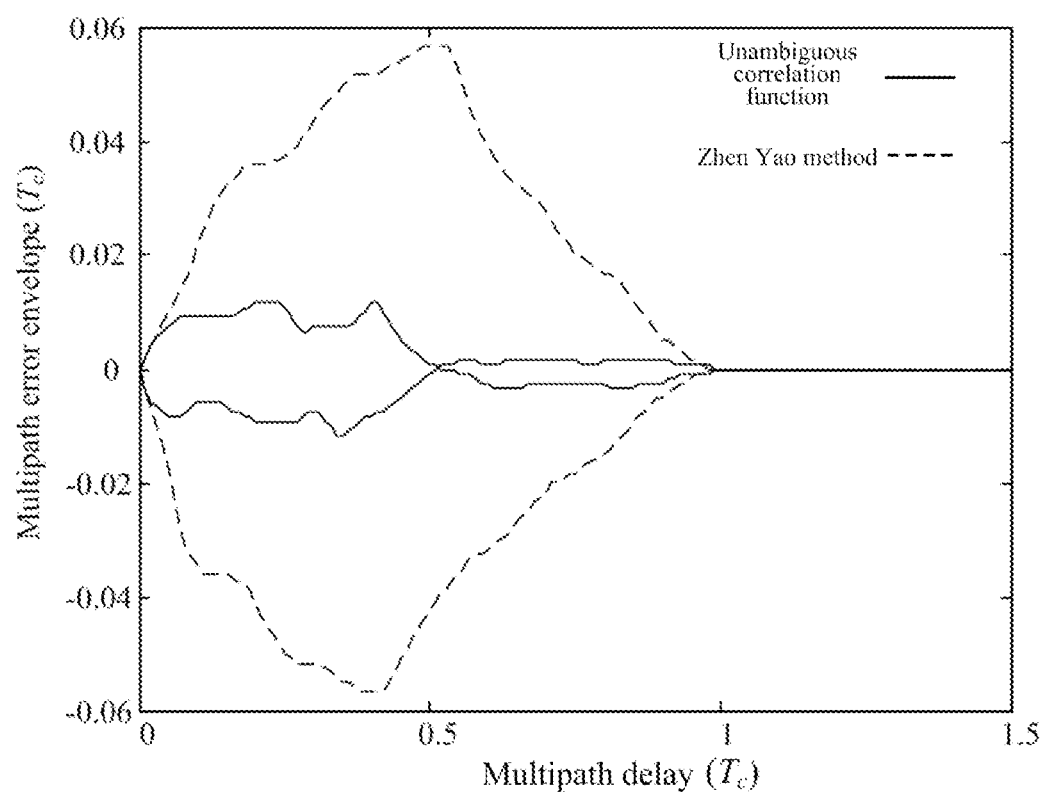
FIG. 6 is a graph illustrating a comparison of performance of a conventional method with performance of an unambiguous correlation function in which CBOC(6,1,1/11,'−') is interpreted as a subcarrier pulse period of $BOC_{sin}(6,1)$.

FIG. 6 is a graph illustrating a comparison of performance of Zheng Yao method with performance of the unambiguous correlation function in which CBOC(6,1,1/11,'−') is interpreted as the subcarrier pulse period of $BOC_{sin}(6,1)$ according to one example. FIG. 6 illustrates MEE performance in a case in which a correlation function of Zheng Yao method and the new unambiguous correlation function of the present example are used when the ratio of the sizes of the signals of the first and second paths is 0.25 for CBOC(6,1,1/11,'−'). As illustrated by FIG. 6, the use of the unambiguous correlation function of the present example exhibits more excellent MEE performance in a multipath delay section than use of the correlation function of Zheng Yao method. This is because the new unambiguous correlation function of the present example more efficiently uses $BOC_{sin}(6,1)$, which is a key of performance improvement of CBOC(6,1,1/11), in comparison with the correlation function of Zheng Yao method.

The units described herein may be implemented using hardware components such as, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a correlation function of a composite binary offset carrier (CBOC) signal at a receiver, the method comprising:
   receiving a CBOC(6,1,1/11) signal at a processor in the receiver;
   interpreting, by using the processor, a subcarrier pulse period of the CBOC(6,1,1/11) signal as a subcarrier pulse period of a binary offset carrier $BOC_{sin}(6,1)$ signal;
   combining, by using the processor, partial correlation functions constituting an autocorrelation function of the CBOC(6,1,1/11) signal to generate a correlation function;
   weighted-combining the correlation function, by using the processor, to generate an unambiguous correlation function of the CBOC(6,1,1/11) signal.

2. The method according to claim 1, wherein the CBOC (6,1,1/11) signal comprises a CBOC(6,1,1/11,'+') signal and a CBOC(6,1,1/11,'−') signal.

3. The method according to claim 1, wherein the interpreting comprises interpreting a subcarrier pulse period of a CBOC(6,1,1/11,'−') signal expressed by the following Equation as a subcarrier pulse period of the $BOC_{sin}(6,1)$ signal:

$$s_{sc}(t) = \sqrt{\frac{10}{11}} BOC_{sin}(1,1) - \sqrt{\frac{1}{11}} BOC_{sin}(6,1)$$

$$= \sqrt{\frac{10}{11}} \sum_{l=0}^{1} (-1)^l r_{T_s^a}(t - iT_c - lT_s^a) -$$

$$\sqrt{\frac{1}{11}} \sum_{m=0}^{11} (-1)^m r_{T_s^b}(t - iT_c - mT_s^b)$$

$$= \sum_{m=0}^{11} s_m(t)$$

wherein $T_s^a = T_c/2$ denotes the subcarrier pulse period of a $BOC_{sin}(1,1)$ signal, and $T_s^b = T_c/12$ denotes the subcarrier pulse period of the $BOC_{sin}(6,1)$ signal.

4. The method according to claim 1, wherein the autocorrelation function is expressed by the following Equation:

$$R(\tau) = \frac{1}{PT} \int_0^T b(t)b(t+\tau) dt$$

$$= \sum_{m=0}^{11} \sum_{j=0}^{T/T_c-1} \frac{1}{PT} \int_{12(j+m)T_s^b}^{(12j+m+1)T_s^b} b(t)b(t+\tau) dt$$

$$= \sum_{m=0}^{11} S_m(\tau)$$

wherein b(t) denotes a CBOC(6,1,1/11,'−') signal, P denotes signal power, T denotes a period of a pseudo-noise code, $T_s^a$ denotes the subcarrier pulse period of a $BOC_{sin}(1,1)$ signal, $T_s^b$ denotes the subcarrier pulse period of the $BOC_{sin}(6,1)$ signal, and $S_m(\tau)$ is an $m^{th}$ partial correlation function.

5. The method according to claim 1, wherein the generating of the correlation function comprises combining the partial correlation functions for a CBOC(6,1,1/11,'−') signal, by using the following Equation to generate an unambiguous correlation function ($\{R_m\}_{m=0}^5$) whose side-peaks have been removed:

$$R_m = |S_m(\tau)| + |S_{11-m}(\tau)| - |S_m(\tau) - S_{11-m}(\tau)|, \ m=0, 1, \ldots, 5$$

wherein $S_m(\tau)$ denotes an $m^{th}$ partial correlation function constituting the autocorrelation function of the CBOC (6,1,1/11,'−') signal.

6. The method according to claim 5, wherein the generating of the unambiguous correlation function comprises weighted-combining the combined partial correlation functions, by using the following Equation to generate the unambiguous correlation function ($R_{proposed}(\tau)$):

$$R_{proposed}(\tau) = \sum_{m=0}^{5} R_m(\tau).$$

7. A non-transitory computer recording medium storing a program causing a computer to execute the method according to claim 1.

8. The method according to claim 1, wherein the CBOC (6,1,1/11) signal is used in a global navigation satellite system (GNSS) modulation scheme for a satellite navigation system.

9. A method of tracking a signal in a terminal that synchronizes a composite binary offset carrier (CBOC) signal, the method comprising:
   receiving, by the terminal, a CBOC(6,1,1/11) signal;
   interpreting, by using a processor electrically connected to the terminal, a subcarrier pulse period of the CBOC (6,1,1/11) signal as a subcarrier pulse period of a binary offset carrier $BOC_{sin}(6,1)$ signal;
   combining, by using the processor, partial correlation functions constituting an autocorrelation function of the CBOC(6,1,1/11) signal to generate a correlation function;
   weighted-combining the combined partial correlation functions, by using the processor, to generate an unambiguous correlation function; and
   tracking the CBOC(6,1,1/11) signal, by the terminal using the unambiguous correlation function.

10. The method according to claim 9, wherein the interpreting comprises interpreting a subcarrier pulse period of a CBOC(6,1,1/11,'−') signal as a subcarrier pulse period of the $BOC_{sin}(6,1)$ signal, that comprises a form of subtraction of a subcarrier of the $BOC_{sin}(6,1)$ signal and a subcarrier of a $BOC_{sin}(1,1)$ signal by using a power division ratio 1/11.

11. The method according to claim 9, wherein the generating of the correlation function comprises combining the partial correlation functions for a CBOC(6,1,1/11,'−') signal, by using the following Equation to generate an unambiguous correlation function ($\{R_m\}_{m=0}^{5}$) whose side-peaks have been removed:

$$R_m = |S_m(\tau)| + |S_{11-m}(\tau)| - |S_m(\tau) - S_{11-m}(\tau)|, \quad m=0, 1, \ldots, 5$$

wherein $S_m(\tau)$ denotes an $m^{th}$ partial correlation function constituting the autocorrelation function of the CBOC (6,1,1/11,'−') signal.

12. The method according to claim 11, wherein the generating of the unambiguous correlation function comprises weighted-combining the combined partial correlation functions, by using the following Equation to generate the unambiguous correlation function ($R_{proposed}(\tau)$):

$$R_{proposed}(\tau) = \sum_{m=0}^{5} R_m(\tau).$$

13. The method according to claim 9, wherein the CBOC (6,1,1/11) signal is used in a global navigation satellite system (GNSS) modulation scheme for a satellite navigation system.

14. A signal tracking apparatus that synchronizes a composite binary offset carrier (CBOC) signal, the apparatus comprising:
   a reception unit configured to receive a CBOC(6,1,1/11) signal;
   a partial correlation function generation unit configured to interpret a subcarrier pulse period of the CBOC(6,1,1/11) signal as a subcarrier pulse period of a binary offset carrier $BOC_{sin}(6,1)$ signal to generate a partial correlation function;
   a correlation function generation unit configured to combine the partial correlation functions to generate a correlation function of the CBOC(6,1,1/11) signal;
   an unambiguous correlation function generation unit configured to weighted-combine the correlation function to generate an unambiguous correlation function; and
   a determination unit configured to track the CBOC(6,1, 1/11) signal, by using the unambiguous correlation function.

15. The apparatus according to claim 14, wherein the partial correlation function generation unit is configured to interpret a subcarrier pulse period of a CBOC(6,1,1/11,'−') signal that is a form of subtraction of a subcarrier of the $BOC_{sin}(6,1)$ signal and a subcarrier of a $BOC_{sin}(1,1)$ signal, by using a power division ratio 1/11, as a subcarrier pulse period of the $BOC_{sin}(6,1)$ signal.

16. The apparatus according to claim 14, wherein the partial correlation functions are combined according to the following Equation to constitute an autocorrelation function $R(\tau)$:

$$R(\tau) = \frac{1}{PT} \int_0^T b(t)b(t+\tau)\,dt$$

$$= \sum_{m=0}^{11} \sum_{j=0}^{T/T_c-1} \frac{1}{PT} \int_{12(j+m)T_s^c}^{(12j+m+1)T_s^b} b(t)b(t+\tau)\,dt$$

$$= \sum_{m=0}^{11} S_m(\tau)$$

wherein b(t) denotes a CBOC(6,1,1/11,'−') signal, P denotes signal power, T denotes a period of a pseudo-noise code, $T_s^a$ denotes the subcarrier pulse period of a $BOC_{sin}(1,1)$ signal, $T_s^b$ dentoes the subcarrier pulse period of the $BOC_{sin}(6,1)$ signal, and $S_m(\tau)$ is an $m^{th}$ partial correlation function.

17. The apparatus according to claim 14, wherein the correlation function generation unit is configured to combine the partial correlation functions for a CBOC(6,1,1/11,'−') signal, by using the following equation to generate a correlation function ($\{R_m\}_{m=0}^{5}$) whose side-peaks have been removed:

$$R_m = |S_m(\tau)| + |S_{11-m}(\tau)| - |S_m(\tau) - S_{11-m}(\tau)|, \quad m=0, 1, \ldots, 5$$

wherein $S_m(\tau)$ denotes an $m^{th}$ partial correlation function constituting the autocorrelation function of the CBOC (6,1,1/11,'−') signal.

18. The apparatus according to claim 17, wherein the unambiguous correlation function generation unit is configured to weighted-combine a correlation function generated by combining the partial correlation functions, by using the following Equation to generate the unambiguous correlation function ($R_{proposed}(\tau)$):

$$R_{proposed}(\tau) = \sum_{m=0}^{5} R_m(\tau).$$

19. The apparatus according to claim 14, wherein the CBOC(6,1,1/11) signal is used in a global navigation satellite system (GNSS) modulation scheme for a satellite navigation system.

* * * * *